(12) United States Patent
Coppedge et al.

(10) Patent No.: US 10,267,264 B2
(45) Date of Patent: Apr. 23, 2019

(54) MONOPROPELLANT DRIVEN HYDRAULIC PRESSURE SUPPLY

(71) Applicant: Bastion Technologies, Inc., Houston, TX (US)

(72) Inventors: Charles Don Coppedge, Houston, TX (US); Joseph Reeves, League City, TX (US); Jayant Ramakrishnan, Houston, TX (US); Jorge Hernandez, Houston, TX (US)

(*) Notice: Subject to any disclaimer, the term of this patent is extended or adjusted under 35 U.S.C. 154(b) by 509 days.

(21) Appl. No.: 14/942,780

(22) Filed: Nov. 16, 2015

(65) Prior Publication Data
US 2016/0138524 A1 May 19, 2016

Related U.S. Application Data

(60) Provisional application No. 62/079,895, filed on Nov. 14, 2014.

(51) Int. Cl.
| | |
|---|---|
| *F02K 9/42* | (2006.01) |
| *F02K 9/60* | (2006.01) |
| *E21B 41/00* | (2006.01) |
| *F02K 9/44* | (2006.01) |
| *F02K 9/68* | (2006.01) |
| *E21B 33/035* | (2006.01) |
| *F41A 1/04* | (2006.01) |
| *F41B 9/00* | (2006.01) |

(Continued)

(52) U.S. Cl.
CPC ............... *F02K 9/605* (2013.01); *C06D 5/04* (2013.01); *E21B 33/0355* (2013.01); *E21B 41/00* (2013.01); *F02K 9/425* (2013.01); *F02K 9/44* (2013.01); *F02K 9/68* (2013.01); *F15B 7/08* (2013.01); *F41A 1/04* (2013.01); *F41B 9/0043* (2013.01); *F15B 2211/218* (2013.01)

(58) Field of Classification Search
CPC . F02K 9/425; F02K 9/44; F02K 9/605; F02K 9/68; F41B 9/0043; F16L 55/053; F16L 55/045
USPC ................................................ 138/31; 60/415
See application file for complete search history.

(56) References Cited

U.S. PATENT DOCUMENTS

| | | |
|---|---|---|
| 2,979,094 A | 4/1961 | Royer |
| 3,018,627 A | 1/1962 | Perricci |

(Continued)

FOREIGN PATENT DOCUMENTS

| | | |
|---|---|---|
| CN | 100419214 C | 9/2008 |
| CN | 101377150 B | 6/2012 |

(Continued)

OTHER PUBLICATIONS

International Search Report and Written Opinion for PCT/US201515/060930, Monopropellant, dated Feb. 2, 2016.

(Continued)

*Primary Examiner* — Todd E Manahan
*Assistant Examiner* — Kyle Robert Thomas
(74) *Attorney, Agent, or Firm* — Winstead PC; Henry Ehrlich

(57) ABSTRACT

A liquid propellant driven hydraulic pressure supply device may include an elongated body having an internal bore extending from a power end to a discharge end having a discharge port, a hydraulic fluid disposed in the bore between a piston and the discharge end and a liquid propellant gas generator connected to the power end.

20 Claims, 4 Drawing Sheets

(51) Int. Cl.
    *C06D 5/04*         (2006.01)
    *F15B 7/08*         (2006.01)

(56) References Cited

U.S. PATENT DOCUMENTS

| | | | |
|---|---|---|---|
| 3,031,845 | A | 5/1962 | Ludwig |
| 3,077,077 | A | 2/1963 | Jones |
| 3,100,058 | A | 8/1963 | Peet |
| 3,100,965 | A | 8/1963 | Blackburn |
| 3,236,046 | A | 2/1966 | Wellman |
| 3,886,745 | A | 6/1975 | Kaida et al. |
| 3,933,338 | A | 1/1976 | Herd et al. |
| 4,074,527 | A | 2/1978 | Sadler |
| 4,163,477 | A | 8/1979 | Johnson et al. |
| 4,308,721 | A | 1/1982 | Thomas et al. |
| 4,412,419 | A | 11/1983 | Thomas et al. |
| 4,461,322 | A | 7/1984 | Mills |
| 4,619,111 | A | 10/1986 | Whiteman |
| 4,777,800 | A | 10/1988 | Hay, II |
| 4,815,295 | A | 3/1989 | Narum |
| 5,004,154 | A | 4/1991 | Yoshida et al. |
| 5,072,896 | A | 12/1991 | McIntyre et al. |
| 5,316,087 | A | 5/1994 | Manke et al. |
| 5,481,977 | A | 1/1996 | Evans et al. |
| 5,647,734 | A | 7/1997 | Milleron |
| 6,202,753 | B1 | 3/2001 | Baugh |
| 6,418,970 | B1 | 7/2002 | Deul |
| 6,817,298 | B1 | 11/2004 | Zharkov et al. |
| 7,011,722 | B2 | 3/2006 | Amtower, II |
| 7,231,934 | B2 | 6/2007 | Biester |
| 7,721,652 | B2 | 5/2010 | Yoshida et al. |
| 7,810,569 | B2 | 10/2010 | Hill et al. |
| 8,453,575 | B2 | 6/2013 | Humbert et al. |
| 8,616,128 | B2 | 12/2013 | Sampson |
| 8,783,357 | B2 | 7/2014 | Coppedge et al. |
| 9,212,103 | B2 | 12/2015 | Coppedge et al. |
| 2004/0089450 | A1* | 5/2004 | Slade .................. B24C 1/045 166/298 |
| 2005/0039914 | A1* | 2/2005 | Purkis ................... E21B 41/00 166/250.15 |
| 2005/0044851 | A1* | 3/2005 | Goldfarb ............... B25J 9/1095 60/508 |
| 2006/0254763 | A1 | 11/2006 | Tips et al. |
| 2009/0178433 | A1 | 7/2009 | Kumakura et al. |
| 2009/0211239 | A1 | 8/2009 | Askeland |
| 2010/0206389 | A1 | 8/2010 | Kennedy et al. |
| 2010/0243267 | A1* | 9/2010 | Edwards ................ E21B 34/12 166/373 |
| 2011/0108285 | A1 | 5/2011 | Fagley, IV et al. |
| 2011/0209869 | A1* | 9/2011 | Smith .................... E21B 43/16 166/260 |
| 2011/0284237 | A1 | 11/2011 | Baugh |
| 2012/0048566 | A1* | 3/2012 | Coppedge ............. E21B 33/038 166/340 |
| 2012/0111572 | A1 | 5/2012 | Cargo, Jr. |
| 2013/0220161 | A1 | 8/2013 | Coppedge et al. |
| 2016/0312563 | A1 | 10/2016 | Rytlewski et al. |

FOREIGN PATENT DOCUMENTS

| | | |
|---|---|---|
| DE | 102007001645 A1 | 7/2008 |
| EP | 0009346 A1 | 4/1980 |
| WO | 2015085200 A1 | 6/2015 |

OTHER PUBLICATIONS

International Search Report and Written Opinion for PCT/US2015/060679, Multiple, dated Mar. 2, 2016.
International Search Report and Written Opinion for PCT/US2013/027680, Pyrotechnic Pressure Accumulator, dated May 8, 2013.
International Search Report and Written Opinion for PCT/US201327680 dated May 8, 2013.
Extended European Search Report in EP Appl. No. 13751969.0, National Phase of PCT/US201327689 dated Oct. 22, 2015.
Supplementary European Search Report, EP Application No. 15 85 9410.1 Monopropellant Driven Hydraulic Pressure Supply, dated Jun. 22, 2018.

* cited by examiner

US 10,267,264 B2

MONOPROPELLANT DRIVEN HYDRAULIC PRESSURE SUPPLY

BACKGROUND

This section provides background information to facilitate a better understanding of the various aspects of the disclosure. It should be understood that the statements in this section of this document are to be read in this light, and not as admissions of prior art.

Pre-charged hydraulic accumulators are utilized in many different industrial applications to provide a source of hydraulic pressure and operating fluid to actuate devices such as valves. It is common for installed pre-charged hydraulic accumulators to be connected to or connectable to a remote source of hydraulic pressure to recharge the accumulator due to leakage and/or after use of the accumulator.

SUMMARY

In accordance to one or more embodiments, a liquid propellant driven hydraulic pressure supply device may include an elongated body having an internal bore extending from a power end to a discharge end having a discharge port, a hydraulic fluid disposed in the bore between a piston and the discharge end and a liquid propellant gas generator connected to the power end.

A method according to one or more aspects of an embodiment of the disclosure includes actuating a device in response to exhausting a first volume of pressurized hydraulic fluid from an elongated body having an internal bore extending substantially from a power end to a discharge end having a discharge port; a liquid propellant thruster or pressure generator connected to the power end, a piston movably disposed in the internal bore and a hydraulic fluid disposed in the bore between the piston and the discharge end. The first volume of pressurized hydraulic fluid is exhausted is response to operating the liquid propellant gas generator for a duration sufficient to drive the piston toward the discharge end. The "burn time" of the gas generator can be controlled in various manners depending in apart in the environment in which the system is utilized.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
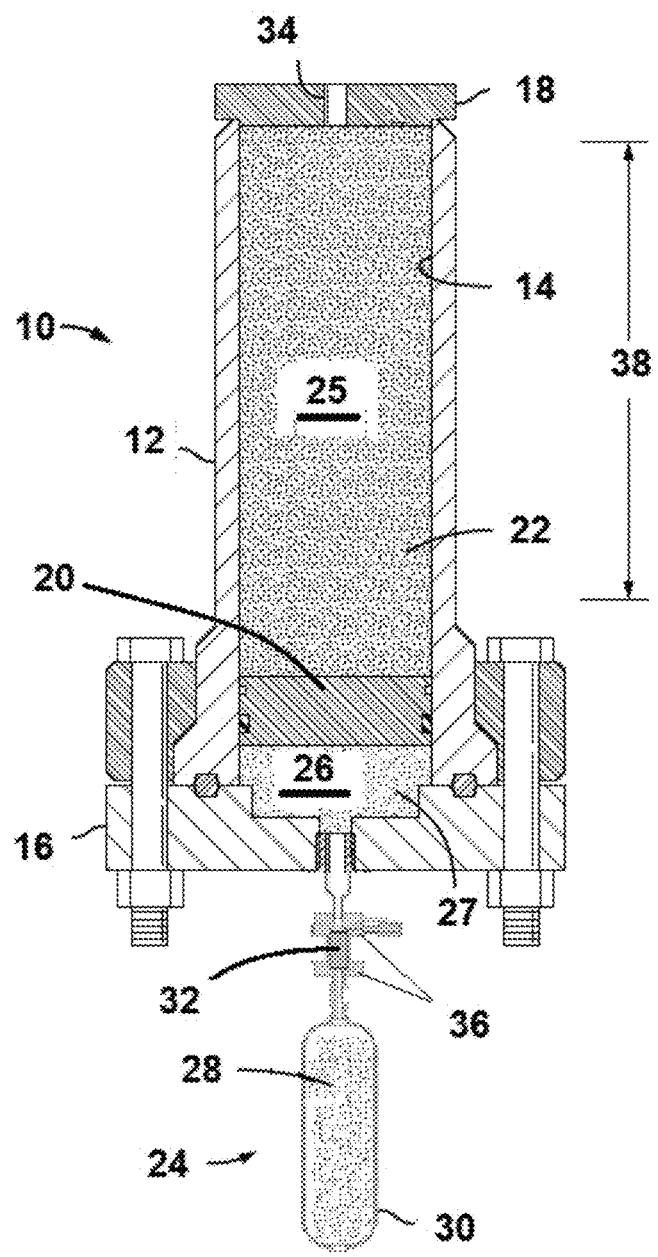
FIG. 1 illustrates a liquid propellant driven hydraulic pressure supply device according to one or more aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

A liquid propellant driven hydraulic pressure supply device is disclosed that provides a useable storage of hydraulic fluid that can be pressurized for use on demand. The liquid propellant driven pressure device can be utilized to establish the necessary hydraulic power to drive and operate hydraulic and mechanical devices and systems (e.g., a hydraulic circuit) and it may be utilized in conjunction with or in place of pre-charged hydraulic accumulators. Examples of utilization of the liquid propellant pressure accumulator are described with reference to subsea well systems, in particular safety systems; however, use of the liquid propellant pressure accumulator is not limited to subsea systems and environments. For example, and without limitation, hydraulic accumulators are utilized to operate valves, actuators, pipe rams, and pipe shears. According to embodiments disclosed herein, the liquid propellant pressure accumulator can be positioned and remain in place without requiring hydraulic pressure recharging. In addition, when located for example subsea the liquid driven hydraulic pressure supply device does not require charging by high pressure hydraulic systems located at the water surface.

FIG. 1 illustrates a liquid propellant driven hydraulic pressure supply device, generally denoted by the numeral 10, in accordance with aspects of an embodiment of the disclosure which may be referred to herein from time to time as an accumulator. Liquid propellant driven hydraulic pressure supply device 10 includes a body 12 having an internal bore or cylinder 14 extending from a power end 16 to a discharge end 18. A piston 20 is moveably disposed in the bore. Hydraulic fluid 22 is disposed in the hydraulic side or chamber 25 of the bore between the piston and the discharge end. A pressure or gas generator 24 is operationally connected to a gas chamber 26 of the power end of the bore on the opposite side of piston 20 from the hydraulic fluid 22.

Figure 2:
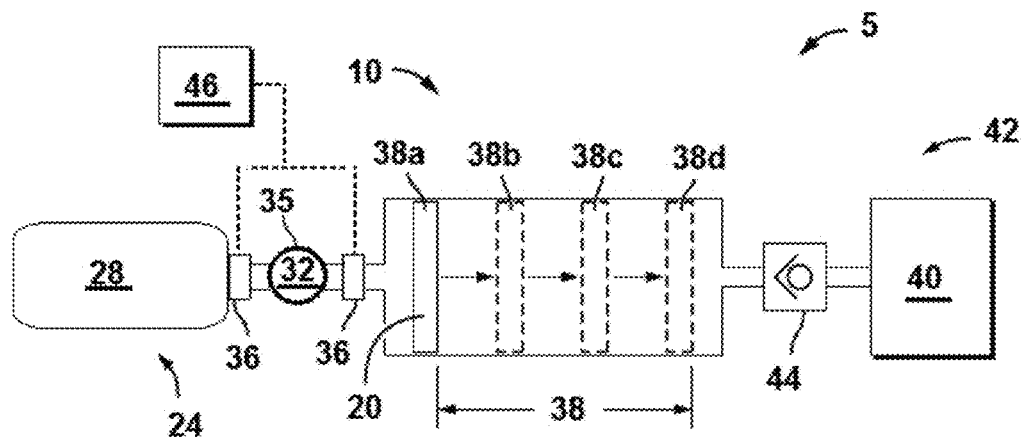
FIG. 2 is a schematic illustration of a system incorporating a liquid propellant driven hydraulic pressure supply device according to one or more aspects of the disclosure.

In accordance with at least one embodiment, gas generator 24 comprises a liquid propellant 28, for example a monopropellant, held in a container 30, which is selectively in communication with the gas chamber 26 of the body 12. In this example, gas generator 24 includes a catalyst material 32 stored for example in a reaction chamber 35 (FIG. 2). When the gas generator is activated, the liquid propellant 28 is fed, e.g. released, from container 30 to the decomposition catalyst 32 which causes the decomposition of the liquid propellant 28 producing a high pressure gas 27 which is fed into gas chamber 26 thereby driving piston 20 toward discharge end 18 and discharging pressurized hydraulic fluid 22 through a discharge port 34 into a hydraulic circuit. The gas generator may be activated by operating valves 36 (e.g. poppet valves) to an open position. The opening and closing of valves 36 may be utilized to control the duration time of the activation for example to move the piston incrementally along the full stroke length 38. Various mechanisms may be utilized to selectively control the volume of hydraulic fluid that is discharged in a single activation. In accordance to some embodiments, an accumulator may initially hold a sufficient volume of hydraulic fluid to pressurize the connected hydraulic circuit more than once.

Various types of liquid propellants and catalysts may be utilized without departing from the scope of this disclosure. For example, hydrogen peroxide (H2O2) may be utilized as the monopropellant and fed across a silver catalyst. In accordance to at least one embodiment, hydrogen peroxide is utilized with a ceramic platinum catalyst. Hydrogen peroxide provides an ecologically safe material. The decomposed hydrogen peroxide products are oxygen and steam. In another example, hydrazine (N2H4) may be utilized as the monopropellant and fed across a catalyst such as iridium supported on a material such as aluminum oxide. Other variants of hydrazine may be utilized as well. Another non-limiting example of a monopropellant is ethylene oxide. Catalyst may comprise ruthenium, rhodium, palladium, osmium, iridium and platinum.

FIG. 2 illustrates a system 5 incorporating a monopropellant driven hydraulic pressure supply device 10. In conjunction with FIG. 1, the system 5 includes an operational device 40 that is operated in response to receiving a hydraulic pressure signal. The operational device may be operated between two or more positions, for example, a flow control device may be operated between an open and a closed position only or may include one or more choked flow positions as well. Operational device 40 includes actuators and devices other than flow control devices and valves. The discharge port 34 of the hydraulic pressure supply 10 is in fluid connection with a hydraulic circuit 42, which includes the operational device 40 and a one-way flow control device 44. As will be understood by those skilled in the art with benefit of this disclosure, the hydraulic circuit may include more than one operational device. FIG. 2 illustrates the piston 20 being moved in sequential steps along the stroke length 38 of the pressure supply device in response to sequential actuation or ignition of the gas generator 24. For example, a signal may be sent from a controller 46 to open the control valves 36 and release the monopropellant gas 28 to be fed to decomposition catalyst 32 resulting in a high pressure product gas 27 which is vented to the gas chamber of the supply device body to drive the piston 20 toward the discharge end and to discharge the hydraulic fluid under pressure. In FIG. 2 the duration of the activation is timed such that piston 20 is driven to a first position illustrated as 38a along the full stroke length to discharge a first volume of pressurized hydraulic fluid 22 to hydraulic circuit 42. The first volume of the pressurized hydraulic fluid actuates the operational device to a first position. Once the desired time of activation has elapsed, the controller closes valves 36. In response to a second activation signal, the control valves 36 may be opened and then closed to drive piston 20 to a second position 38b to discharge a second volume of pressurized hydraulic pressure. The second volume of pressurized hydraulic fluid may actuate the operational device to a second position, which may be returning the operational device back to its original state or position. In accordance to some embodiments, the monopropellant driven hydraulic pressure supply device may be sized to operate through several piston positions 32a, 32b, 32c, 32d etc. without requiring that the liquid propellant, catalyst or the hydraulic fluid be resupplied.

Figure 3:
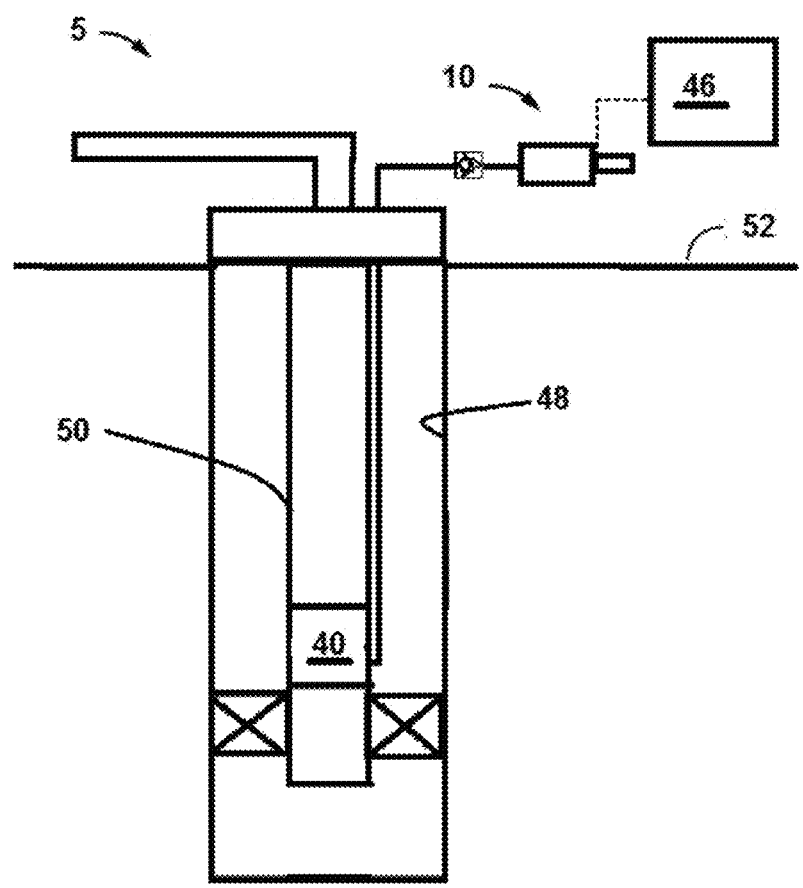
FIGS. 3 through 5 illustrate well systems incorporating liquid propellant driven hydraulic pressure supply devices according to one or more aspects of the disclosure.

Refer now to FIG. 3 illustrating a well system 5 incorporating a monopropellant driven hydraulic pressure supply device 10. In FIG. 3, an operational device 40 is disposed in a wellbore 48 for example on a conveyance 50 (e.g., tubular, pipe). Well system 5 may be a land based or subsea well. The monopropellant driven hydraulic pressure supply 10 is located at a surface 52, e.g. the land, seafloor, deck, and the operational device 40 is located in the wellbore.

Figure 4:
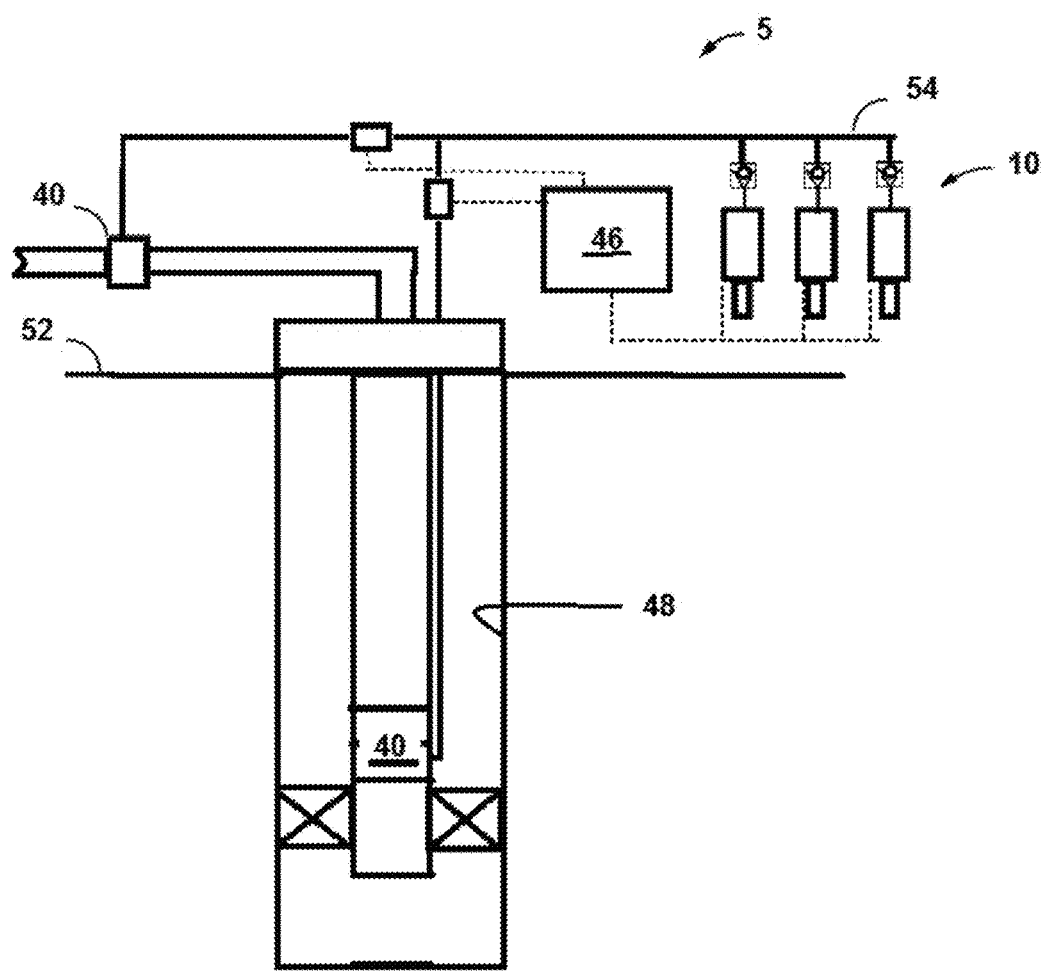

FIG. 4 illustrates another example of a well system 5 incorporating monopropellant driven hydraulic pressure supply devices 10. In this example, multiple monopropellant driven hydraulic pressure supply devices are connected to two or more operational devices 40, for example through a manifold 54. A first operational device 40 is disposed in the wellbore and a second operational device is located above the surface for example at the wellhead or in a production line.

Figure 5:
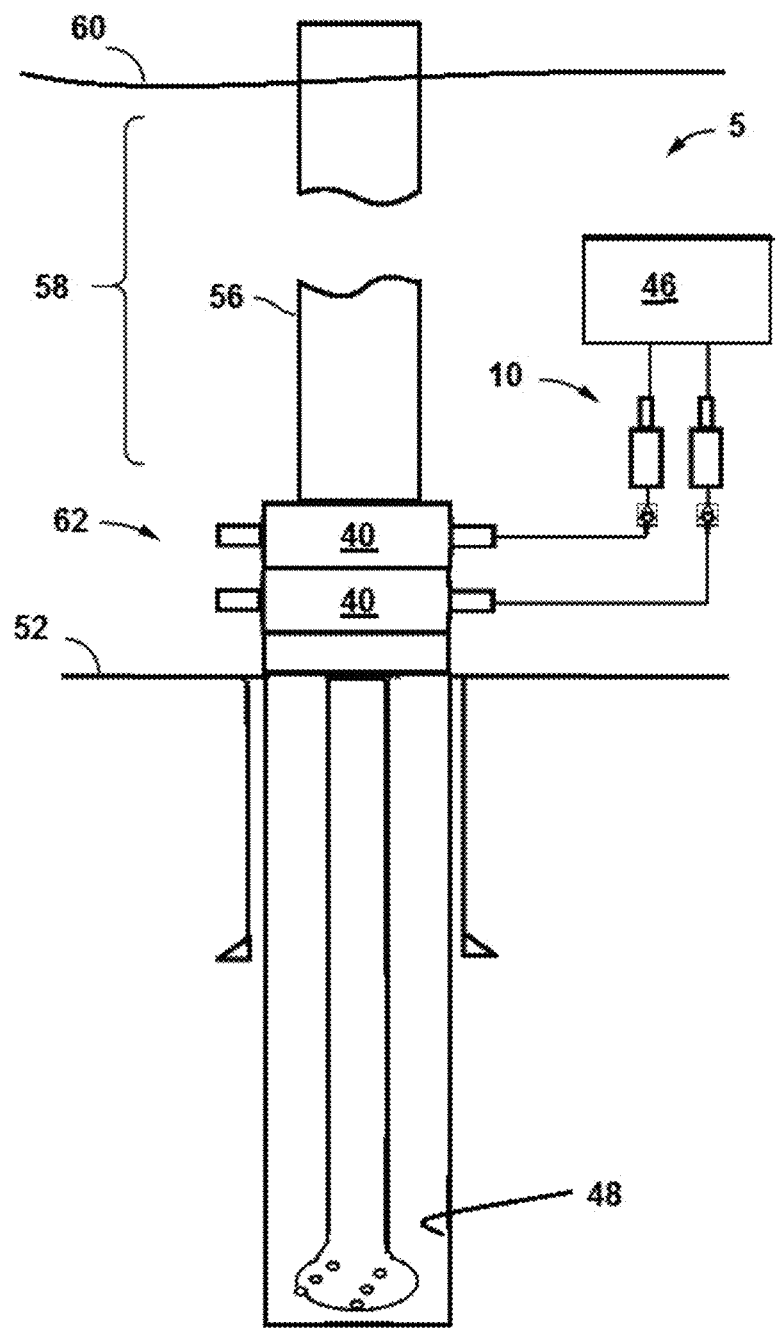

FIG. 5 illustrates another example of a well system 5 incorporating monopropellant driven hydraulic pressure supply devices 10. Wellbore 48 extends from a seafloor 52. A riser 56 forms the wellbore from the seafloor through the water column 58 to the water surface 60. The monopropellant driven hydraulic pressure supply devices 10 are located at or proximate to the seafloor 52 and connected to operational devices 40 of a well safing system 62. Safing system 62 can include various devices 40. For example, and without limitation, safing system 62 may comprise a blowout preventer stack including one or more of rams 40 (e.g., pipe and blind rams) as well as tubular shears 40.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of actuating a hydraulically operated device, comprising:

exhausting, in response to a first demand to actuate the hydraulically operated device, a first volume of pressurized hydraulic fluid from a pressure supply device, the pressure supply device comprising an elongated body having an internal bore extending from a power end to a discharge end having a discharge port in fluid communication with the hydraulically operated device, a piston movably disposed in the internal bore, a hydraulic fluid disposed in the internal bore between the piston and the discharge end, and a gas generator comprising a monopropellant and a decomposition catalyst operationally connected to the power end of the internal bore, wherein the exhausting the first volume of pressurized hydraulic fluid comprises activating the gas generator; receiving, by the hydraulically operated device, the exhausted first volume of the pressurized hydraulic fluid; and actuating the hydraulically operated device to a first position in response to the receiving the exhausted first volume of the pressurized hydraulic fluid by the hydraulically operated device.

2. The method of claim 1, wherein the exhausting the first volume of hydraulic fluid comprises moving the piston a first distance less than a full stroke length.

3. The method of claim 2, comprising exhausting, in response to a second demand to actuate the hydraulically operated device, a second volume of the pressurized hydraulic fluid from the pressure supply device in response to a second activating of the gas generator;
receiving, by the hydraulically operated device, the exhausted second volume of the pressurized hydraulic fluid; and
actuating the hydraulically operated device to a second position in response to the receiving the second volume of the pressurized hydraulic fluid by the hydraulically operated device.

4. The method of claim 1, wherein the activating the gas generator comprises feeding the monopropellant to the decomposition catalyst and communicating a pressurized gas produced by decomposition of the monopropellant into a gas chamber of the internal bore.

5. The method of claim 1, wherein the hydraulically operated device is connected in a well system.

6. The method of claim 1, wherein the hydraulically operated device is connected in a well system, and further comprising:
exhausting, in response to a second demand to actuate the hydraulically operated device, a second volume of the pressurized hydraulic fluid from the pressure supply device in response to a second activating of the gas generator;
receiving, by the hydraulically operated device, the exhausted second volume of the pressurized hydraulic fluid; and
actuating the hydraulically operated device to a second position in response to the receiving the second volume of the pressurized hydraulic fluid by the hydraulically operated device.

7. The method of claim 6, wherein the activating the gas generator comprises feeding the monopropellant to the decomposition catalyst and communicating a pressurized gas produced by decomposition of the monopropellant into a gas chamber of the internal bore.

8. The method of claim 1, wherein the hydraulically operated device is a flow control device having two or more operational positions.

9. The method of claim 1, wherein the hydraulically operated device is a blowout preventer connected to a wellbore.

10. The method of claim 1, wherein the hydraulically operated device is located in a wellbore and the pressure supply device is located exterior of the wellbore.

11. The method of claim 1, wherein the discharge port is in fluid connection with a hydraulic circuit comprising the hydraulically operated device and a one-way flow control device permitting flow of the pressurized hydraulic fluid exhausted from the pressure supply device through the discharge port to the hydraulically operated device.

12. The method of claim 11, wherein the hydraulically operated device is a flow control device having two or more operational positions.

13. The method of claim 11, wherein the hydraulically operated device is a blowout preventer connected to a wellbore.

14. The method of claim 11, wherein the hydraulically operated device is located in a wellbore and the pressure supply device is located exterior of the wellbore.

15. The method of claim 3, wherein the exhausting the first volume of hydraulic fluid comprises moving the piston a first distance less than a full stroke length.

16. The method of claim 3, wherein the hydraulically operated device is a flow control device having two or more operational positions.

17. The method of claim 3, wherein the hydraulically operated device is a blowout preventer connected to a wellbore.

18. The method of claim 3, wherein the hydraulically operated device is located in a wellbore and the pressure supply device is located exterior of the wellbore.

19. The method of claim 6, wherein the exhausting the first volume of hydraulic fluid comprises moving the piston a first distance less than a full stroke length.

20. The method of claim 11, wherein the exhausting the first volume of hydraulic fluid comprises moving the piston a first distance less than a full stroke length.

* * * * *